United States Patent [19]
Cooper

[11] Patent Number: 5,407,225
[45] Date of Patent: Apr. 18, 1995

[54] INVISIBLE AIRBAG DOOR HAVING REINFORCED PVC SHELL

[75] Inventor: Robert Cooper, Ottawa, Canada

[73] Assignee: Davidson Textron, Dover, N.H.

[21] Appl. No.: 109,006

[22] Filed: Aug. 19, 1993

[51] Int. Cl.6 .............................................. B60R 21/16
[52] U.S. Cl. .............................. 280/728 B; 280/743 R; 280/732
[58] Field of Search .............. 280/728 B, 743 R, 731, 280/732, 728 R

[56] References Cited

U.S. PATENT DOCUMENTS

| | | | |
|---|---|---|---|
| 3,892,425 | 7/1975 | Sakairi et al. | 280/150 |
| 4,097,064 | 6/1978 | Ikawa et al. | 280/732 |
| 4,327,937 | 5/1982 | Scholz et al. | 280/732 |
| 4,810,005 | 5/1989 | Fohl | 280/732 |
| 4,834,421 | 5/1989 | Korber et al. | 280/732 |
| 4,836,576 | 6/1989 | Werner et al. | 280/731 |
| 4,852,907 | 8/1989 | Shiraki et al. | 280/731 |
| 4,878,689 | 11/1989 | Mitzkus et al. | 280/731 |
| 4,925,209 | 5/1990 | Sakurai | 280/728 B X |
| 4,963,412 | 10/1990 | Kokeguchi | 428/137 |
| 4,968,057 | 11/1990 | Rafferty | 280/731 |
| 5,069,477 | 12/1991 | Shiraki | 280/732 |
| 5,082,310 | 1/1992 | Bauer | 280/728 B X |
| 5,096,221 | 3/1992 | Combs et al. | 280/728 B X |
| 5,118,132 | 6/1992 | Nakajima | 280/728 |
| 5,125,683 | 6/1992 | Nakajima | 280/731 |
| 5,161,819 | 11/1992 | Rhodes, Jr. | 280/728 B |
| 5,186,490 | 2/1993 | Adams et al. | 280/731 |
| 5,219,177 | 6/1993 | Wang | 280/732 X |
| 5,222,760 | 6/1993 | Rafferty | 280/728 B |
| 5,252,164 | 10/1993 | Mills | 280/728 B |

FOREIGN PATENT DOCUMENTS 0415362  3/1991  European Pat. Off. ........ 280/728 B

*Primary Examiner*—Margaret A. Focarino
*Assistant Examiner*—Christopher P. Ellis
*Attorney, Agent, or Firm*—Reising, Ethington, Barnard Perry & Milton

[57] ABSTRACT

An invisible airbag door arrangement is integrated into a decorative automotive instrument panel to create an opening for airbag deployment. The arrangement comprises two self hinging sheet metal doors that are attached to a substrate frame and a cast polyvinyl chloride thermoplastic (PVC) shell that forms part of the decorative covering of the instrument panel. The back side of the PVC shell is reinforced with a urethane adhesive coating that also the bonds PVC shell to a layer of elastomeric urethane foam that is foamed in place beneath the PVC shell.

24 Claims, 1 Drawing Sheet

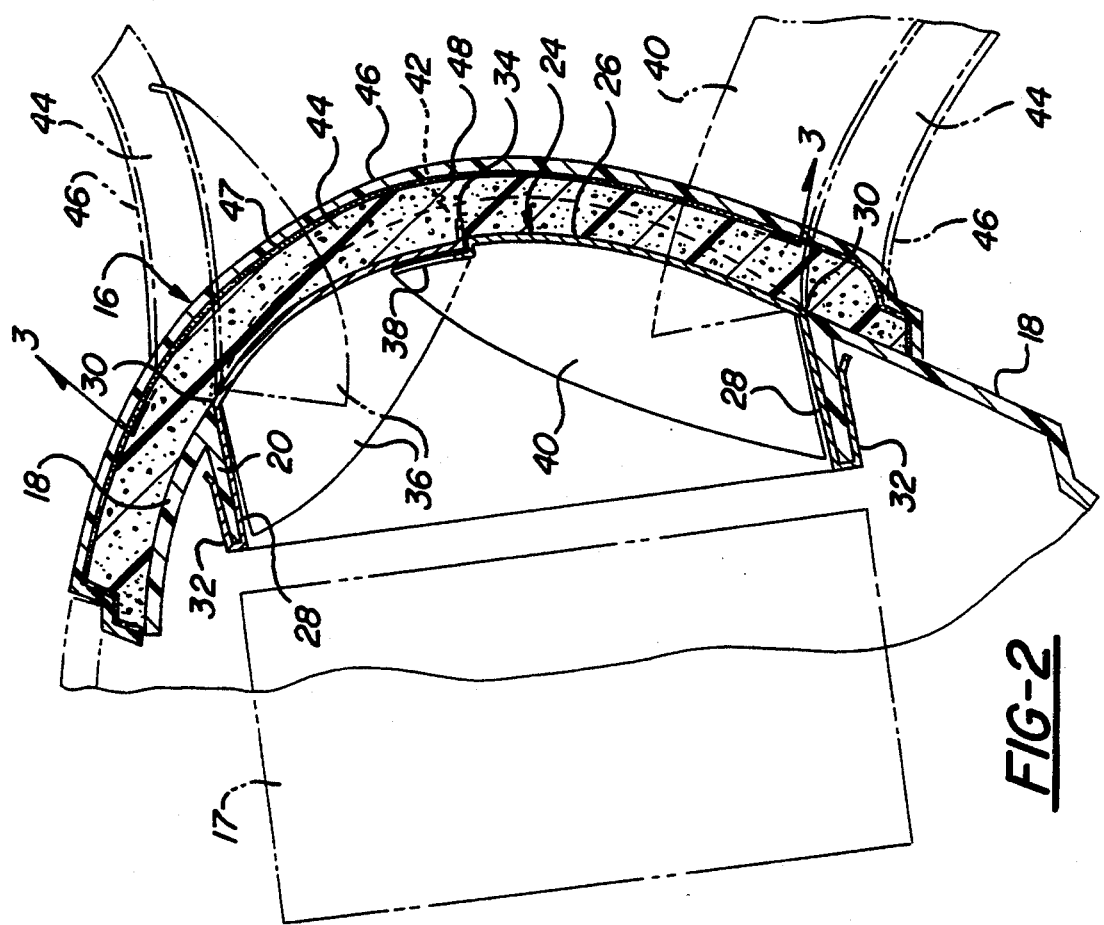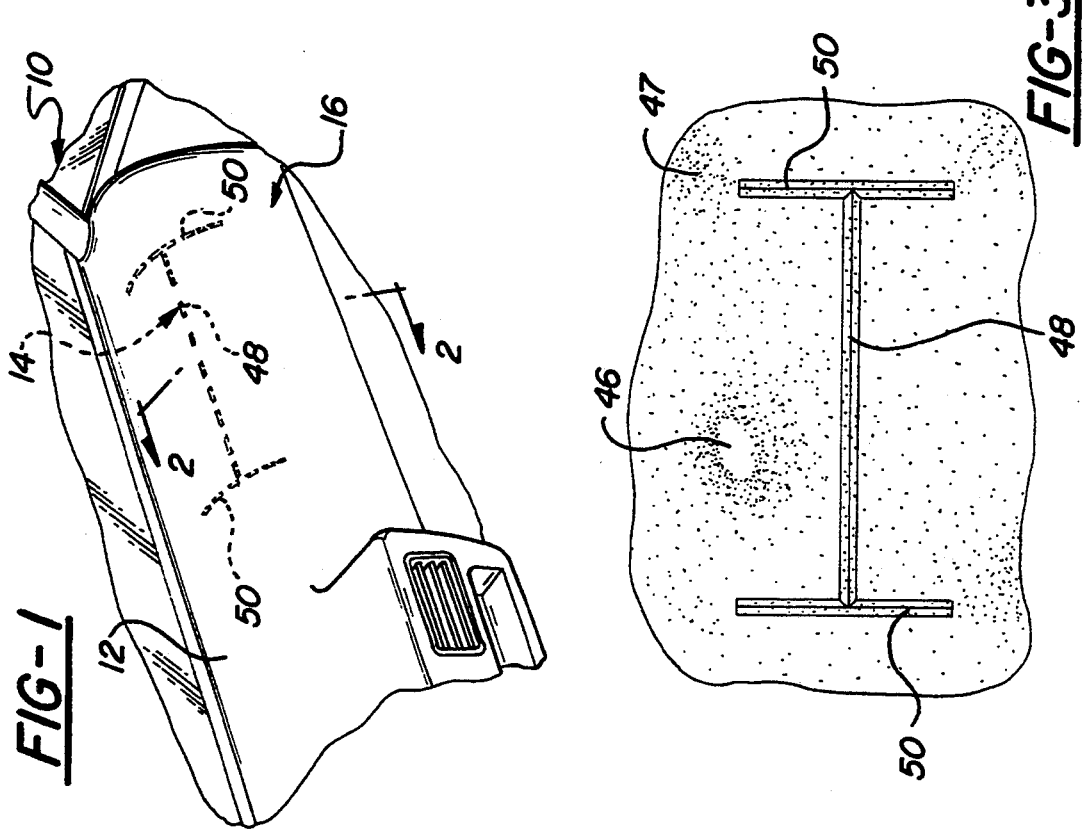

INVISIBLE AIRBAG DOOR HAVING REINFORCED PVC SHELL

BACKGROUND OF THE INVENTION

This invention relates to generally to airbag closures and more particularly to invisible door arrangements that include coverings that are ruptured and pushed open by an inflating air bag to create an opening for deployment of the airbag into the passenger compartment of a vehicle.

An example of an invisible door arrangement is disclosed in U.S. patent application Ser. No. 07/975,724 filed by Robert Cooper Nov. 13, 1992 and assigned to Davidson Textron, Inc. assignee of this invention. The Cooper patent application is hereby incorporated in this patent specification by reference.

Briefly the Cooper patent application discloses an invisible door arrangement that comprises two self hinging sheet metal doors that are attached to a substrate frame, a vinyl plastic skin or shell that forms part of the decorative covering of the instrument panel, and an intermediate foam layer. The internal surface of the plastic shell is scored in an H-shaped pattern to provide weakened areas or tear lines that are ruptured to create an opening in the plastic shell when the airbag is deployed.

Invisible door arrangements of the type exemplified by the Cooper patent application are generally designed to operate in environments ranging from a low temperature of about −20 degrees fahrenheit to a high temperature of about 170 degrees fahrenheit. Many of these invisible door arrangements comprise a polyvinyl chloride (PVC) thermoplastic shell that tends to become brittle at the low temperature end. Consequently invisible door arrangements that have an outer PVC shell tend to experience some fragmentation that produces debris when the PVC shell is ruptured during airbag deployment at the low temperature end. On the other hand, a PVC shell tends to soften at the high temperature end. Consequently invisible door arrangements that have an outer PVC shell also tend to overstretch and increase the time for the tear lines to rupture when the airbag is deployed at the high temperature end.

SUMMARY OF THE INVENTION

The object of this invention is to improve the performance of an invisible airbag door arrangement that has an outer PVC shell that is ruptured and pushed open during airbag deployment, particularly at the low and high temperature ends of its operating range.

A feature of the invention is that the invisible airbag door arrangement incorporates and reinforces a rupturable PVC shell in a way that minimizes or at least reduces shell fragmentation when the airbag is deployed.

Another feature of the invention is that the invisible airbag door arrangement incorporates and reinforces a rupturable PVC shell in a way that minimizes or at least reduces shell expansion when the airbag is deployed.

Still another feature of the invention is that the invisible airbag door arrangement incorporates and reinforces a rupturable PVC shell in a way that minimizes or at least reduces the time required to rupture the PVC shell and create an opening when the airbag is deployed.

Still yet another feature of the invention is that the invisible airbag door arrangement incorporates and reinforces a rupturable PVC shell in a way that improves adhesion of the PVC shell when it is used in conjunction with an elastomeric urethane foam layer.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is a fragmentary perspective view of an automotive passenger compartment having an instrument panel that is equipped with a passenger side airbag and an invisible door arrangement of this invention for generating an opening in the instrument panel for the deployment of the airbag;

FIG. 2 is a section taken substantially along the line 2—2 of FIG. 1 looking in the direction of the arrows showing the invisible door arrangement of this invention installed in an instrument panel; and FIG. 3 is a rear view of the reinforced PVC shell shown in FIGS. 1 and 2 taken substantially along the line 3—3 of FIG. 2 looking in the direction of the arrows.

DESCRIPTION OF THE INVENTION

Referring now to the drawing, an automotive passenger compartment 10 has an instrument panel 16 that forms part of the decorative interior trim panels of the automobile. Passenger compartments, particularly front seat passenger compartments, now often include driver side and passenger side airbags that are deployed to protect the driver and passenger in the event of a collision.

The airbags are typically housed in a receptacle or canister that is mounted behind a steering wheel pad for the driver or behind the instrument panel for the passenger. In either event, the airbag is located behind a decorative panel that must be provided with an opening for deployment of the airbag in some fashion when the airbag is deployed.

The invisible door arrangement of this invention provides such an opening in a decorative panel for deployment of the airbag responsive to inflation of the airbag.

The patent drawings illustrate an invisible door arrangement 14 of this invention for providing an opening in the instrument panel 16 for the deployment of a passenger side airbag that is housed in a schematically represented canister 17 that is behind the instrument panel 16. However, the invention is also applicable to a driver side airbag that is housed in a steering wheel pad.

The invisible door arrangement 14 that is shown covered by the decorative instrument panel 16 in FIG. 1, comprises a curved substrate or insert 18 that is molded of relatively rigid plastic material and secured in the passenger compartment behind the instrument panel 12 and in front of the canister 17 containing a deflated airbag. The substrate has an integral, generally rectangular frame 20. The frame 20 projects inwardly of the substrate 18 toward the canister 17 and defines a generally rectangular opening for deployment of the airbag when it is inflated.

The invisible door arrangement 14 further comprises two similar sheet metal doors 22 and 24 that close the opening outlined by the frame 20 and that cooperate to create an opening through the instrument panel 12 when the airbag is deployed. The doors are economically made of one-piece construction and are preferably made of aluminum which is light and easy to form.

The metal door 22 has a curved closure portion 26 that matches the contour of the curved substrate 18 and an inward flange 28 that creates a bend 30 at one edge of the closure portion 26. The free end of the flange 28 is bent back toward the panel portion 26 to provide an integral, resilient U-shaped clip 32 that grips a side wall of the frame 20 to secure the door 22 in place. Once the door 22 is secured, the bend 30 acts as a hinge for swinging the closure portion 26 from a closed position behind the decorative panel 16 to an open position extending through the decorative panel 16 when the closure portion is pushed by the inflating airbag housed in the canister 17. The closed position is shown in solid lines in FIG. 2 while the open position is shown in phantom lines.

The metal door 22 also has a short outwardly projecting flange or lip 34 at the opposite edge of the closure portion 26 that extends for the full width of the closure portion 26 and stiffens the closure portion 26 in the lateral direction. The lip 34, which preferably has a chisel shaped tip 3, is used to initiate a central-slit in the decorative panel 16 for generating an opening in the decorative panel 16 for deployment of the airbag into the passenger compartment as the closure portion 26 is pushed from the closed position to the open position by the inflating airbag.

The metal door 22 also has integral, perpendicular side wings 36 at the side edges of the closure portion 26 that stiffen the closure portion 26 in the vertical direction and protect the airbag during deployment.

As indicated above, the metal door 24 is similar and consequently corresponding portions are identified with the same numerals.

Thus the metal door 24 also has a curved closure portion 26 that matches the contour of the curved substrate 18 and an inward flange 28 that creates a bend 30 at one edge of the closure portion 26. The free end of the flange 28 is bent back toward the panel portion 26 to provide an integral, resilient U-shaped clip 32 that grips an opposite side wall of the frame 20 to secure the door 24 in place. The bend 30 then acts as a hinge for swinging the closure portion 26 of the door 24 from a closed position behind the decorative panel 16 to an open position extending through the decorative panel 16 when the closure portion 26 is pushed by the inflating airbag housed in the canister 17. Again the closed position is shown in solid lines in FIG. 2 while the open position is shown in phantom lines.

The metal door 24 has a depressed flange or shelf 38 at the end margin of its closure portion 26 that extends for the width of the closure portion 26. The depressed shelf 38 underlies the outwardly projecting flange 34 and end margin of the closure portion 26 of door 22 when the doors 22 and 24 are in the closed position as shown in solid lines in FIG. 2. The depressed shelf 38 provides many advantages. First of all, it helps the outwardly projecting lip 34 of the other metal door to slit and tear the decorative panel 16 during the initial stages as both doors are simultaneously pushed out by the inflating airbag to create an opening in the decorative panel 16 for deployment of the airbag. Secondly, the depressed shelf 38 stiffens the closure portion 26 of the door 24 in the lateral direction. The depressed shelf 38 also provides a stop for other door 22 so that the closed position of the doors 22 and 24 is determined easily and the doors 22 and 24 do not cave in easily. Furthermore, the depressed shelf 38 provides a shield and a labyrinth seal at the interface of the doors 22 and 24 that prevents penetration of foreign objects and materials at the door interface. Moreover the edge of the depressed shelf sweeps upwardly at the shelf ends to assure initiation of the tear at the center of the door.

The metal door 24 also has integral, perpendicular side wings 40 at the side edges of its closure portion 26 that stiffen its closure portion 26 in the vertical direction and protect the airbag during deployment. The side wings 40, however, are also attached to the side edges of the depressed shelf 38. Consequently the side wings 40 are juxtaposed the inside surfaces of the side wings 36 of the door 22 so that the integral side wings 36 and 40 both extend for the full height of their respective metal doors 22 and 24 as shown in FIGS. 2.

The substrate 18 may also include stabilizing ribs 42 adjacent the short sides of the rectangular frame 20. These stabilizing ribs 42 which project forwardly and embed in the decorative panel 16 as shown in FIG. 2 reduce cracking of the outer shell or skin when the invisible door arrangement 14 is insert molded as part of the decorative instrument panel 16.

The decorative instrument panel 16 further comprises an elastomeric urethane foam layer 44 that is covered by a polyvinyl chloride (PVC) thermoplastic shell or skin 46.

An important feature of the invention is that the PVC shell 46 is reinforced with a urethane adhesive coating 47 that is flexible and remains pliable throughout the operational temperature range of the invisible airbag door. A suitable urethane is a two component thermosetting urethane adhesive, such as Bostik 9601 that cures to a form a flexible non-porous laminate or layer on the back of the PVC shell 46. Bostik 9601 is a product of Bostic Canada, Inc. of Kichener, Ontario. Similar urethanes are also available from other companies.

The amount of the urethane adhesive coating 47 that is applied is significantly greater than that would be necessary for a simple adhesive function. The amount applied must be enough so that the coated shell takes on the physical characteristics of the urethane particularly at the low and high ends of the operational temperature range mentioned above. I have found that the urethane adhesive coating 47 should have a thickness in the range of about 0.020 inches to about 0.040 inches for a PVC shell that is typically about 0.040 inches in thickness but that could range in thickness from about 0.030 inches to about 0.050 inches.

The urethane adhesive coating 47 can be applied by painting or spraying a liquid mixture of urethane adhesive precursors directly on the back side of the PVC shell 46 in liquid form, or casting a mixture of the liquid urethane adhesive precursors into a urethane sheet which is then ironed on the back side of the PVC shell 46.

The back side or internal surface of the PVC shell 46 is scored or notched in a H-pattern as shown in FIGS. 1, 2 and 3 to provide weakened areas comprising a central tear line 48 and side tear lines 50. The central tear line 48 promotes a central slit for initiating an airbag deployment opening through the decorative panel 16 that is propagated by tearing the slit decorative panel along the side tear lines 50.

The urethane adhesive coating 47 is preferably applied to the entire back side of the PVC shell 46 but at least to the area that creates the airbag opening and a significant marginal portion surrounding the area that creates the air bag opening. In this particular instance the entire portion between the side tear lines 50 creates the creates the airbag opening and thus at least this area and a significant marginal portion surrounding the area between the side tear lines 50 should be coated.

The tear lines 48 and 50 are provided after the urethane adhesive coating 47 is applied and cured by cutting through the cured coating 47 and scoring the backside or internal surface of the PVC shell 46 in a conventional manner.

The urethane adhesive coated and scored PVC shell 46 may be placed in a mold (not shown) in a spaced relationship with the substrate 18 and the attached metal doors 22 and 24. The elastomeric urethane foam cushion 44 is then foamed in place in a conventional manner. The foam cushion 44 may also be reinforced with netting or fiber if desired.

The invisible door arrangement 14 operates as follows. When the airbag in the canister 17 inflates, it pushes against the sheet metal doors 22 and 24 which break through the elastomeric urethane foam layer 44 and rupture the tear lines 48 and 50 of the PVC shell 46 creating an airbag deployment opening in the decorative panel 16 very quickly and efficiently as the metal door 22 and 24 swing to the fully open position shown in phantom in FIG. 2.

The urethane adhesive coating 47 improves the performance of the PVC shell 47 during the airbag deployment, particularly at the high and low ends of the operational temperature range. More specifically the urethane adhesive coating 47 remains pliable throughout the operational temperature range and thus minimizes or at least reduces fragmentation of the PVC shell 46 and the creation of debris when the airbag is deployed, particularly at the low temperature end. Moreover, the urethane adhesive coating 47 retains a more consistent dimensional stability throughout the operational temperature range and thus the coating 47 also minimizes or at least reduces expansion of the PVC shell 46 and the time required to rupture the tear lines 48 and 50 when the airbag is deployed, particularly at the high temperature end.

These desirable characteristics are also enhanced by the fact that the adhesion of the PVC shell 46 to the elastomeric urethane foam layer 44 is improved by the presence of the urethane adhesive coating 47 because the PVC-urethane adhesive-urethane foam bond is better than a direct PVC-urethane foam bond without an intermediate urethane adhesive coating.

While the invention has been explained in connection with a particular type of invisible door arrangement, it should be understood that the invention can be used with other types of invisible door arrangements that have an outer PVC shell. The invention may also be used irrespective or whether or not an elastomeric urethane foam layer is used even though the full benefits of the invention may not be realized.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An invisible airbag door arrangement for providing an opening in a decorative panel for the deployment of an airbag that is covered by the decorative panel comprising;
    a substrate that is adapted for securement between a deflated airbag and the decorative panel covering the deflated airbag and that defines an opening for deployment of the airbag,
    at least one door that is connected to the substrate for swinging from a closed position behind the decorative panel to an open position extending through the decorative panel, and
    a rupturable thermoplastic shell covering the substrate and the door,
    the plastic shell being reinforced with an adhesive coating that is flexible and remains pliable throughout the operational temperature range of the invisible airbag door, and that is equal to at least about 40% the thickness of the shell.

2. The invisible airbag door arrangement as defined in claim 1 wherein the shell is reinforced with a urethane coating.

3. The invisible airbag door arrangement as defined in claim 2 wherein the urethane adhesive coating has a thickness that is sufficient to dominate the physical characteristics of the shell.

4. The invisible airbag door arrangement as defined in claim 2 wherein the adhesive coating is a thermosetting urethane adhesive that cures to form a flexible non-porous laminate or layer on the back side of the shell.

5. The invisible airbag door arrangement as defined in claim 4 wherein the adhesive coating is cut through and the back side of the shell is scored or notched to provide weakened areas or tear lines that define an area for creating an airbag opening in the shell.

6. The invisible airbag door arrangement as defined in claim 4 wherein the airbag adhesive coating is applied to the entire back side of the PVC-shell.

7. The invisible airbag door arrangement as defined in claim 4 wherein the adhesive coating is applied at least to the area for creating an airbag opening in the PVC shell and a significant marginal portion surrounding the area for creating the airbag opening.

8. The invisible airbag door arrangement as defined in claim 1 further comprising an elastomeric foam layer that is bonded to the thermoplastic shell by the adhesive coating.

9. The invisible airbag door arrangement as defined in claim 4 wherein the coated PVC shell is spaced from the substrate and the attached door by an elastomeric urethane foam layer that is bonded to the PVC shell by the adhesive reinforcement coating.

10. An invisible airbag door arrangement for providing an opening in a decorative panel for the deployment of an airbag that is covered by the decorative panel comprising;
    a substrate that is adapted for securement between a deflated airbag and the decorative panel covering the deflated airbag and that defines an opening for deployment of the airbag,
    at least one door that is connected to the substrate for swinging from a closed position behind the decorative panel to an open position extending through the decorative panel, and a polyvinyl chloride (PVC) shell covering the substrate and the door, the PVC shell being reinforced with an adhesive coating that is flexible and remains pliable throughout an operational temperature range from about −20 degrees fahrenheit to about 170 degrees fahrenheit to reduce fragmentation of the PVC shell when the airbag is deployed at low temperatures and to reduce stretching of the PVC shell and the time required to rupture the PVC shell when the airbag is deployed at high temperatures.

11. The invisible airbag door arrangement as defined in claim 10 wherein the adhesive coating is a urethane adhesive coating that has a thickness sufficient to dominate the physical characteristics of the PVC shell throughout the operational temperature range.

12. The invisible airbag door arrangement as defined in claim 10 wherein the adhesive coating is a thermosetting urethane adhesive that cures to form a flexible non-porous layer on the back side of the PVC shell.

13. The invisible airbag door arrangement as defined in claim 10 wherein the adhesive coating is cut through and the back side of the PVC shell is scored or notched to provide weakened areas or tear lines that define an area for creating an airbag opening in the PVC shell.

14. The invisible airbag door arrangement as defined in claim 10 wherein the adhesive coating is applied to the entire back side of the PVC shell.

15. The invisible airbag door arrangement as defined in claim 13 wherein the adhesive coating is applied at least to the area for creating an airbag opening in the PVC shell and a significant marginal portion surrounding the area.

16. The invisible airbag door arrangement as defined in claim 10 further comprising an elastomeric urethane foam layer that is covered by the coated polyvinyl chloride (PVC) shell.

17. The invisible door arrangement as defined in claim 11 wherein the coated PVC shell is spaced from the substrate and the attached door by an elastomeric urethane foam layer that is bonded to the PVC shell.

18. The invisible door arrangement as defined in claim 12 further comprising an elastomeric urethane foam layer that is covered by the coated polyvinyl chloride (PVC) shell, the adhesion of the PVC shell to the elastomeric urethane foam layer being enhanced by the urethane adhesive reinforcement layer.

19. An invisible airbag door arrangement for providing an opening in a decorative panel for the deployment of an airbag that is covered by the decorative panel comprising;

a substrate that is adapted for securement between a deflated airbag and the decorative panel covering the deflated airbag and that defines an opening for deployment of the airbag, at least one door that is connected to the substrate for swinging from a closed position behind the decorative panel to an open position extending through the decorative panel, and a polyvinyl chloride (PVC) shell covering the substrate and the door, the PVC shell being reinforced with a thermosetting urethane adhesive that cures to form a non-porous coating on the back side of the PVC shell that is flexible and remains pliable throughout an operational temperature range from about −20° F. to about 170° F. to reduce fragmentation of the PVC shell when the airbag is deployed at low temperatures and to reduce stretching of the PVC shell and the time required to rupture the PVC shell when the airbag is deployed at high temperatures, the coating being cut through and the back side of the PVC shell being scored or notched to provide weakened areas or tear lines that define an area for creating an airbag opening in the PVC shell, and an elastomeric urethane foam layer that is bonded to the polyvinyl chloride (PVC) shell by the urethane adhesive coating.

20. An invisible airbag door arrangement for providing an opening in a decorative panel for the deployment of an airbag that is covered by the decorative panel comprising;

a substrate that is adapted for securement between a deflated airbag and the decorative panel covering the deflated airbag and that defines an opening for deployment of the airbag, at least one door that is connected to the substrate for swinging from a closed position behind the decorative panel to an open position extending through the decorative panel, and a polyvinyl chloride (PVC) shell covering the substrate and the door, the PVC shell being reinforced with a thermosetting urethane adhesive that cures to form a non-porous coating on the back side of the PVC shell that is flexible and remains pliable throughout an operational temperature range from about −20° F. to about 170° F. to reduce fragmentation of the PVC shell when the airbag is deployed at low temperatures and to reduce stretching of the PVC shell and the time required to rupture the PVC shell when the airbag is deployed at high temperatures, the coating being cut through and the back side of the PVC shell being scored or notched to provide weakened areas or tear lines that define an area for creating an airbag opening in the PVC shell, an elastomeric urethane foam layer that is bonded to the polyvinyl chloride (PVC) shell by the urethane adhesive coating, and the PVC shell having a thickness in a range from about 0.030 inches to about 0.050 inches and the urethane adhesive coating having a thickness in a range from about 0.020 inches to about 0.040 inches.

21. An invisible airbag door arrangement for providing an opening in a decorative panel for the deployment of an airbag that is covered by the decorative panel comprising;

a substrate that is adapted for securement between a deflated airbag and a decorative panel covering the deflated airbag and that defines an opening for deployment of the airbag;

at least one door that is connected to the substrate for swinging from a closed position behind the decorative panel to an open position extending through the decorative panel, and a polyvinyl chloride (PVC) shell covering the substrate and the door, the PVC shell being reinforced with an adhesive coating that is flexible and remains pliable throughout an operational temperature range from about −20 degrees fahrenheit to about 170 degrees fahrenheit to reduce fragmentation of the PVC shell when the airbag is deployed at low temperatures and to reduce stretching of the PVC shell and the time required to rupture the PVC shell when the airbag is deployed at high temperatures, and the PVC shell having a thickness in a range from about 0.030 inches to about 0.050 inches and the urethane adhesive coating having a thickness in a range from about 0.020 inches to about 0.040 inches.

22. The invisible airbag door arrangement as defined in claim 1 wherein the adhesive coating has a thickness that ranges from about 40% to about 80% of the thickness of the shell.

23. An invisible airbag door arrangement for providing an opening in a decorative panel for the deployment of an airbag that is covered by the decorative panel comprising;

a substrate that is adapted for securement between a deflated airbag and a decorative panel covering the deflated airbag and that defines an opening for deployment of the airbag, at least one door that is connected to the substrate for swinging from a closed position behind the decorative panel to an open position extending through the decorative panel, and a polyvinyl chloride shell covering the substrate and the door that has a thickness in a range from about 0.030 inches to about 0.050 inches, and the shell being reinforced with an adhesive coating that has a thickness in a range from about 0.020 inches to about 0.040 inches.

24. The invisible airbag door arrangement as defined in claim 23 wherein the shell is reinforced with a thermosetting urethane adhesive coating, wherein the coating is cut through and the back side of the shell is scored or notched to provide weakened areas or tear lines that define an area for creating an airbag opening in the shell, and wherein an elastomeric foam layer is bonded to the shell by the urethane adhesive coating.

* * * * *